April 26, 1927.

E. H. REMDE 1,626,555

INDUSTRIAL TRUCK

Original Filed March 11, 1921     3 Sheets-Sheet 1

INVENTOR:
Edward H. Remde
BY Edward R. Alexander
ATTORNEY

April 26, 1927. 1,626,555

E. H. REMDE

INDUSTRIAL TRUCK

Original Filed March 11, 1921   3 Sheets-Sheet 3

INVENTOR:
Edward H. Remde
BY
Edward R. Alexander
ATTORNEY

Patented Apr. 26, 1927.

1,626,555

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Application filed March 11, 1921, Serial No. 451,622. Renewed January 27, 1927.

This invention relates to a truck for industrial uses, more particularly to a truck having mounted on it an elevating and carrying mechanism, whereby goods can be transported from place to place rapidly and economically.

One object of the invention is to provide a truck having an improved elevating and carrying mechanism so constructed that hollow goods or objects may be readily positioned thereon, elevated, transported and lowered.

Another object of the invention is to provide a truck of this character having a relatively long member arranged to be projected into or through a plurality of annular bodies to elevate the same whereby the truck is capable of handling such annular bodies in a ready manner.

Other objects of the invention will be apparent to those skilled in the art to which my invention relates from the following description taken in connection with the accompanying drawings.

Figures 1, 2:
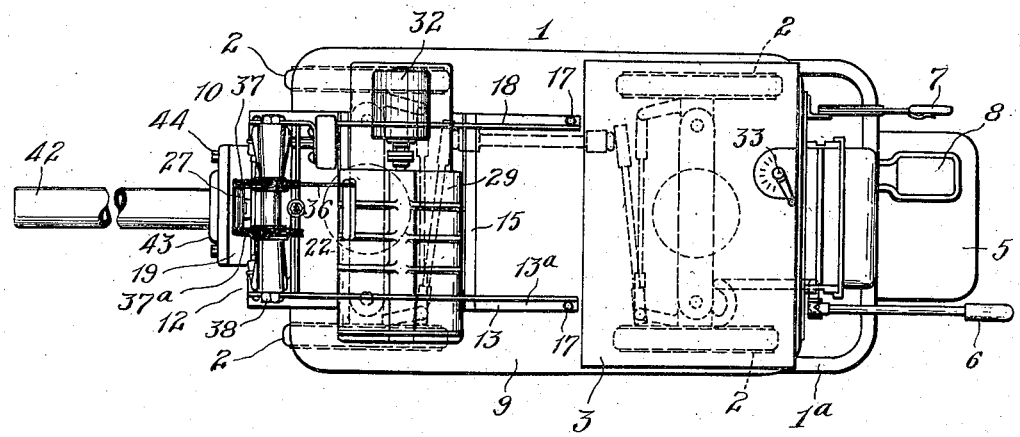
Figure 1 is a side elevation of a truck having mounted on it an elevating and carrying mechanism embodying my invention.
Fig. 2 is a top plan view of the truck shown in Fig. 1, the preferred form of steering construction being shown in dotted lines.
Figure 3:
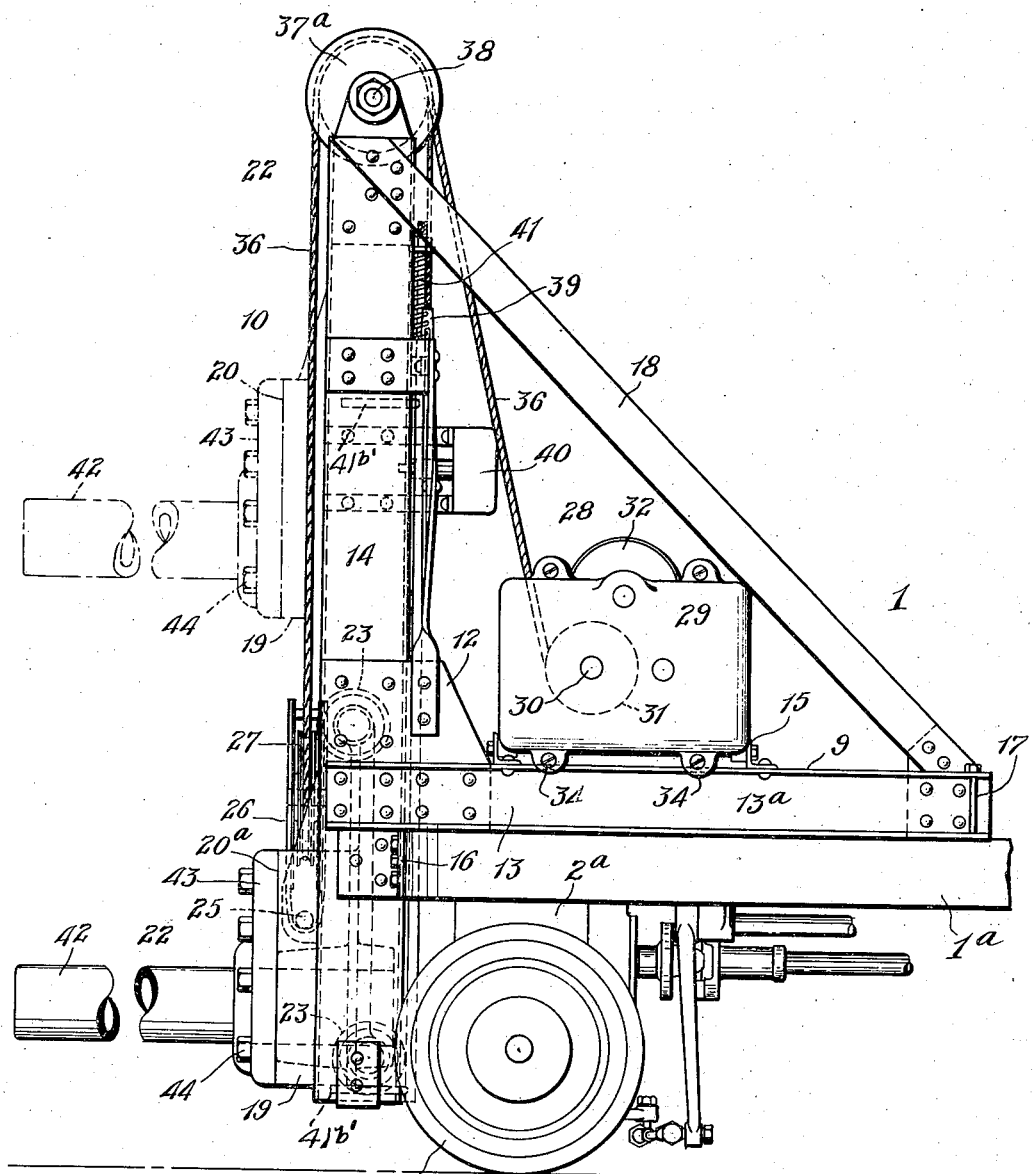
Fig. 3 is a fragmentary, side elevational view, enlarged.

In the drawings, 1 indicates as an entirety the truck or motor vehicle, preferably of the electric motor-driven type, and having a frame 1ª and wheels 2, certain or all of which, if desired, may be driven by a driving mechanism 2ª and steered. 3 indicates a housing within which suitable storage batteries 4 may be arranged. In Figs. 1 and 2 I have shown at one end of the truck a platform 5 on which the operative may stand, and control elements 6, 7 and 8 in convenient positions for manipulation in a well-known way.

10 indicates as an entirety the lifting and carrying mechanism rigidly mounted on the frame 1ª and platform 9 of the truck 1. 14 indicates a pair of spaced guide members preferably extending vertically above and below the frame 1ª, these elements being preferably so arranged that the guide members 14 are disposed vertically at that end of the frame 1ª opposite to the operative's platform 5. The guide members 14 preferably consist of channel bars the flanges of which serve as front and rear guide walls for an elevating member 19 to be later referred to.

12 indicates a frame including a base 13. The base 13 preferably comprises a pair of channel bars 13ª, which may be connected together by cross members, one thereof being indicated at 15. The frame 12 is secured to the truck frame by a pair of angle plates 16, which are bolted and riveted to the truck frame 1ª and guide members 14, respectively, and by bolts extending through the channel bars 13ª near their inner ends 17. The upper ends of the guides 14 may be braced by a pair of tie-rods 18 rigidly secured in any well-known manner to the inner ends of the bars 13ª.

The elevating member 19 preferably comprises a casting having a body portion 19ª provided with seats 20, 20ª, and pairs of upper and lower arms 21. The body portion 19ª is adapted to have connected to it a lifting and carrying element 22 which will be later described. 23 indicates devices carried by the arms 21 and arranged to engage the flanges of the guide members 14. The devices 23 preferably comprise flanged rollers 23ª mounted on stud-shafts 23ᵇ the stems of which fit into openings formed in the arms 21 of each pair. The arms 21 are preferably offset, relative to the central longitudinal plane of the guide members, whereby the upper devices 23 will engage the front flanges of the guide members 14 and the lower devices 23 will engage the rear flanges thereof. 24 indicates a pair of spaced lugs between which extends a pin or shaft 25. 26 indicates a frame swiveled on the pin or shaft 25 and supporting between its bifurcated members a pulley 27 the purpose of which will be later set forth.

28 indicates as an entirety a mechanism for raising and lowering the elevating member 19. Of this mechanism, 29 indicates a frame preferably in the form of a casing. The opposite end walls of the casing are provided with openings to receive and support the opposite ends of a shaft 30 carrying a drum 31. 32 indicates an electric motor preferably mounted on a bracket or other extension member of the frame 29. The shaft of the motor 32 is connected through suitable gearing (not shown) with the drum shaft 30, whereby the latter may be driven in either direction at will. 33 indicates a suitable controller, for operating the motor 32. The controller is placed within convenient reach of the operative. 34 indicates a plurality of devices serving to rigidly clamp the casing 29 to the bars 13ª, at all times. 36 indicates the hoisting member, such as a cable or rope, which is adapted to be wound on and unwound from the drum 31. The rope is connected to the drum in any suitable manner. In the disclosed arrangement the rope 36 extends upwardly from the drum 31 to and around a sheave 37 loosely mounted on a shaft 38 supported by the upper ends of the guide members 14. The rope then extends downwardly around the pulley 27 and then upwardly and over a second sheave 37ª on the shaft 38, its opposite end being anchored in any desired manner, for example by a clamp 39.

Figures 4, 5, 6:
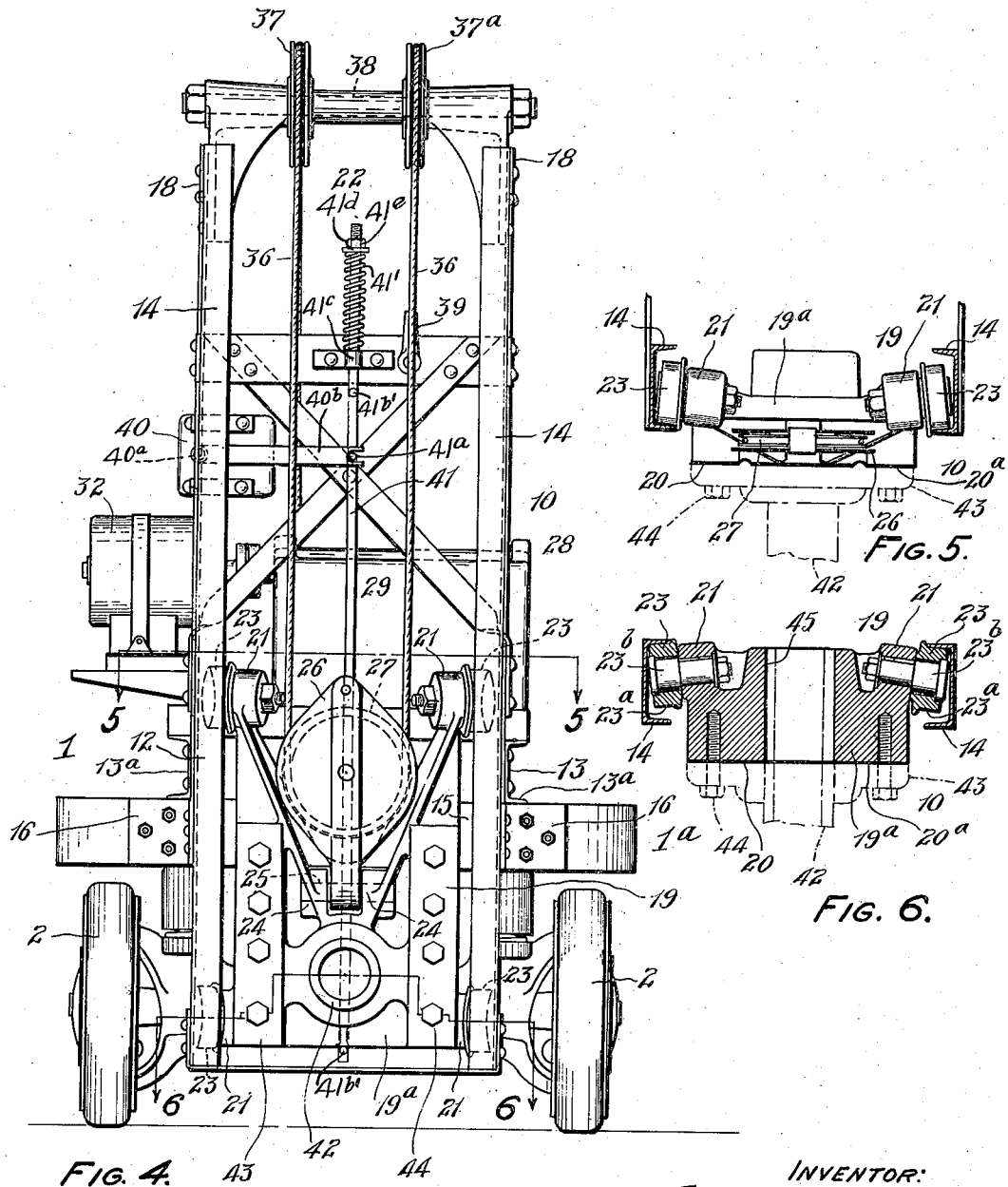
Fig. 4 is a front view of the parts shown in Fig. 3.
Fig. 5 is a sectional view on the line 5—5 of Fig. 4.
Fig. 6 is a sectional view on the line 6—6 of Fig. 4.

40 indicates a casing enclosing pairs of suitable contact devices, through which electric current is established to operate the motor 32 when the lifting member is raised and lowered. 40ª indicates a rock shaft mounted in the casing wall and carrying on its outer end an arm 40ᵇ and on its inner end and within the casing an element arranged to engage the movable contact of either pair of contacts to break the electric circuit when the arm 40ᵇ is swung in one direction or the other. At its outer end the arm 40ᵇ is bifurcated and straddles a pin or projection 41ª carried by a movable member 41. The member 41 preferably comprises a bar and carries a pair of spaced tappets 41ᵇ′, 41ᵇ′, which project into the path of movement of the elevating member 19 or some element carried thereby. The bar 41 is slidably mounted by suitable guide devices 41ᶜ (one being shown in Fig. 4), whereby it can move endwise in either direction. The normal position of the bar 41 is shown in Fig. 4, being held against movement downwardly by a coiled spring 41′ interposed between the guide device 41ᶜ and a collar or washer 41ᵈ adjustably mounted on the upper end of the rod by a nut 41ᵉ. Upon engagement of the member 19 with one of the tappets 41ᵇ′, when operated to its extreme upper or lower position, the bar 41 is moved endwise and it in turn, through the pin 41ª, swings the arm 40ᵇ, causing the latter to break the circuit. This operation shuts off the motor and arrests the elevating member 19 against further movement. If the bar 41 has been moved upwardly, it will move downwardly by gravity when the elevating member 19 is operated downwardly, until the spring 41′ engages the guide device 41ᶜ; if the bar 41 has been moved downwardly, such movement will compress the spring 41′ which will return the bar to normal position when the elevating member 19 moves upwardly.

The lifting and carrying element 22 shown in the drawings, is so shaped that it can be first moved, extended or projected in an endwise direction into or through a plurality of hollow or ring-shaped devices or objects arranged in a row (for example, coils of wire, vehicle tires or rims) that are to be transported, and then lifted or elevated to free the devices or objects from their support; thus adapting itself as an automatic loader. For this application of my invention the lifting and carrying element 22 comprises a horizontally extending arm 42 and a base member 43 adapted to be removably secured to the seats or base portions 20, 20ª, of the elevating member 19 by a plurality of cap screws 44. The arm 42 preferably comprises a tubular member and its inner end may extend through and beyond the base member 43 and removably fit an opening 45 formed in the elevating member 19. As a result of this arrangement, the screws 44 are relieved of undue strains, when the lifting and carrying element 22 is supporting or transporting objects.

To those skilled in the art of making mechanism of the class described, many alterations in construction and widely differing embodiments and applications of my invention will suggest themselves, without departing from the spirit and scope thereof. My disclosures and the description herein are purely illustrative and are not intended to be in any sense limiting beyond the scope of the following claims.

What I claim is:

1. In apparatus of the class described, the combination with a truck frame and wheels for said frame, of a pair of vertical guides disposed at one end of the frame, an elevating member slidably supported by said guides and provided on its face with seats, a lifting device comprising a base member removably secured to said seats and a relatively long narrow element secured at one end to said base member and extending in an endwise direction therefrom for projection into or through a hollow body, and mechanism for raising and lowering said elevating member.

2. In apparatus of the class described, the combination with a truck frame and wheels for said frame, of a pair of vertical guides disposed at one end of the frame and extending above and below it, an elevating member slidably supported by said guides, a lifting device comprising a base member secured to said elevating member and a relatively long, narrow element secured at its inner end to said base member and extending in an endwise direction centrally therefrom, and mechanism for raising and lowering said elevating member.

3. In apparatus of the class described, the combination with a truck frame and wheels for said frame, of a pair of vertical guides disposed at one end of the frame and extending above and below it, an elevating member slidably supported by said guides, a lifting device comprising a relatively long, narrow element secured at its inner end to said elevating member and extending in an endwise direction therefrom for projection into or through a hollow body, and mechanism for raising and lowering said elevating member.

4. In apparatus of the class described, the combination with a truck frame and wheels for supporting said frame, of a pair of vertical guides disposed at one end of said frame and extending above and below it, an elevating member slidably supported by said guides, a lifting device comprising a cylindrical member carried at one end by said elevating member and extending therefrom for projection into or through a hollow body, and mechanism for raising and lowering said elevating member.

5. In apparatus of the class described, the combination of a main frame mounted on wheels, a guide frame arranged at one end of said main frame and extending vertically, an elevating member guided in said guide frame, said member comprising a body portion formed with an opening, a base formed with an opening arranged to register with the opening in the body portion, means for securing the base to the body portion, a cylindrical lifting member extending at its inner end through the opening in said base member and removably fitting the opening in said elevating member and arranged to project beyond the end of said main frame for projection into or through a hollow body, and means for raising and lowering said elevating member.

6. In apparatus of the class described, the combination with a truck frame and wheels for said frame, of a vertical guide on said frame, an elevating member slidably supported by said guide, a lifting device comprising a base member secured to said elevating member and a relatively long, narrow element secured at one end to said base member and extending in an endwise direction therefrom for projection into or through a hollow body, and mechanism for raising and lowering said elevating member.

In testimony whereof I affix my signature.

EDWARD H. REMDE.